United States Patent
Devoy et al.

(10) Patent No.: US 8,425,847 B2
(45) Date of Patent: Apr. 23, 2013

(54) PROCESSES AND APPARATUS FOR CONTINUOUS SOLUTION POLYMERIZATION

(75) Inventors: Bruce C. Devoy, Livingston, TX (US);
Vetkav R. Eswaran, Houston, TX (US);
Chris B. Friedersdorf, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 221 days.

(21) Appl. No.: 12/972,223

(22) Filed: Dec. 17, 2010

(65) Prior Publication Data

US 2011/0172337 A1   Jul. 14, 2011

Related U.S. Application Data (60) Provisional application No. 61/294,885, filed on Jan. 14, 2010.

(51) Int. Cl.
| | |
|---|---|
| B01J 19/00 | (2006.01) |
| C08F 210/00 | (2006.01) |
| C08F 2/08 | (2006.01) |
| B32B 17/10 | (2006.01) |
| B60C 1/00 | (2006.01) |

(52) U.S. Cl.
USPC .......... 422/131; 422/138; 526/348; 524/290; 524/396; 524/570

(58) Field of Classification Search ............ 422/131, 422/138; 526/348; 524/290, 396, 570
See application file for complete search history.

(56) References Cited

U.S. PATENT DOCUMENTS

| | | | |
|---|---|---|---|
| 2,862,243 | A | 12/1958 | Farr et al. |
| 3,207,818 | A | 9/1965 | Marshall |
| 3,804,423 | A | 4/1974 | Booy |
| 3,912,698 | A | 10/1975 | Shurts |
| 5,306,556 | A | 4/1994 | Rowland |
| 6,126,836 | A | 10/2000 | Ding et al. |
| 6,881,800 | B2 | 4/2005 | Friedersdorf |
| 7,163,989 | B2 | 1/2007 | Friedersdorf |

(Continued)

FOREIGN PATENT DOCUMENTS

| | | |
|---|---|---|
| EP | 0 254 826 | 2/1988 |
| EP | 0 695 719 | 2/1996 |

(Continued)

OTHER PUBLICATIONS

T. G. Gutowski et al., "A Low-Energy Solvent Separation Method," Polymer Engineering and Science, Mar. 1983, vol. 23, No. 4, pp. 230-237.

(Continued)

*Primary Examiner* — William Cheung (57) ABSTRACT

The disclosure provides a plant for the continuous solution polymerization of a feed comprising one or more olefin monomers in a solvent, e.g., hydrocarbon solvent, in which the plant comprises means for separating solvent from the polymer including a flash tank and a vacuum devolatilizer. The plant also includes in a first aspect stabilizer addition means for adding a stabilizer to the concentrated polymer fines at a location downstream of the flash and upstream of the vacuum devolatilizer. In another aspect the plant comprises means to add a molten stabilizer to the polymer at a location downstream of the reactors.

12 Claims, 2 Drawing Sheets

U.S. PATENT DOCUMENTS

| | | |
|---|---|---|
| 2004/0024146 A1 | 2/2004 | Friedersdorf |
| 2005/0154183 A1 | 7/2005 | Ekart et al. |
| 2010/0152396 A1 | 6/2010 | Fleury et al. |

FOREIGN PATENT DOCUMENTS

| | | |
|---|---|---|
| EP | 1 003 814 | 5/2000 |
| GB | 889088 | 2/1962 |
| WO | WO 92/14766 | 9/1992 |
| WO | WO 94/00500 | 1/1994 |
| WO | WO 98/02471 | 1/1998 |
| WO | WO 01/46273 | 6/2001 |
| WO | 02/34795 * | 5/2002 |
| WO | WO 02/34795 | 5/2002 |
| WO | 2006/077214 | 7/2006 |
| WO | WO 2008/082511 | 7/2008 |

OTHER PUBLICATIONS

C. A. Irani et al., "Lower Critical Solution Temperature Behavior of Ethylene Propylene Copolymers in Multicomponent Solvents," Journal of Applied Polymer Science 1986, vol. 31, pp. 1879-1899.

Mark A. McHugh et al., "Separating Polymer Solutions with Supercritical Fluids," Macromolecules 1985, vol. 18, Issue 4, pp. 674-680.

Hajime Tanaka, "Critical dynamics and phase separation kinetics in dynamically asymmetric binary fluids: New dynamic universality class for polymer mixtures or dynamic crossover?," Journal of Chemical Physics Apr. 1, 1994, 100 (7), pp. 5323-5337.

S. J. Han et al., "Short Chain Branching Effect on the Cloud Point Pressures of Ethylene Copolymers in Subcritical and Supercritical Propane," Macromolecules 1998, vol. 31, pp. 2533-2538.

* cited by examiner

PROCESSES AND APPARATUS FOR CONTINUOUS SOLUTION POLYMERIZATION

CROSS-REFERENCE TO RELATED APPLICATIONS

This application claims the priority to and the benefit of U.S. Ser. No. 61/294,885, filed Jan. 14, 2010. This application is related to the following concurrently filed U.S. Provisional applications: U.S. Ser. No. 61/294,871, U.S. Ser. No. 61/294,876, U.S. Ser. No. 61/294,891, each of which was filed Jan. 14, 2010 and each of which are herein incorporated by reference.

FIELD OF INVENTION

The disclosure relates to processes and apparatus for continuous solution polymerization. The disclosure relates especially to such processes and apparatus which involve the addition of a stabilizer to a polymer during manufacture of the polymer.

BACKGROUND OF INVENTION

Continuous solution polymerization processes generally involve the addition of catalyst to a monomer and solvent mixture. The mixture may be back-mixed giving a uniform polymer in an environment with substantially no concentration gradients. WO 94/00500 (Pannell et al.), incorporated herein by reference, describes a solution polymerization using metallocene in a continuous stirred tank reactor, which may be in a series reactor arrangement to make a variety of products.

For the purposes of this patent specification the term "metallocene" is herein defined to contain one or more cyclopentadienyl moiety in combination with a transition metal of the Periodic Table of Elements.

The heat of the polymerization reaction, called an exotherm, can be absorbed by the polymerization mixture. Alternatively, or in addition, the heat of reaction can be removed by a cooling system, by external cooling of the walls of the reactor vessel, or by internally arranged heat exchange surfaces cooled by a heat exchange fluid.

In the course of the polymerization, typically, a predominant amount (over 50 mol %) of the monomer is consumed and the polymer formed is dissolved in the solvent. The higher the concentration of the polymer, the higher the viscosity of the polymerization reaction mixture containing the polymer, solvent, and unreacted components. The mixture passes from the polymerization reactor to a finishing section in which polymer, solvent and unreacted monomer are separated. In the course of finishing, solvent and unreacted monomer are progressively removed from the polymerization mixture until the polymer can be formed into a solid pellet or bale. The separated solvent and monomer can be recycled to the polymerization reactor.

It is well known from extensive literature sources that polymer solutions can undergo phase separation at the lower critical solution temperature, with phase separation being encouraged by higher temperatures and/or by lower pressures. Solvents selection also influences the conditions where phase separation occurs.

The phenomenon of phase separation is firstly a consideration in the selection of the polymerization solvent. Appropriate polymerization monomer conversions, especially of the volatile monomers, temperatures, and pressures have to be selected for given polymer/solvent combination conditions to avoid unwanted phase separation inside the reactor. Solvents such as hexane may require an elevated pressure in excess of 50 bar to avoid two-phase conditions for olefin polymerization; solvents such as octane can maintain homogeneous one-phase conditions at lower pressures.

The phenomenon of phase separation can secondly be exploited after the reaction step to separate volatile solvent and unreacted monomer components on the one hand, and polymer on the other hand. In that case, separation at temperature well above the lower critical solution temperature is encouraged to allow the polymer to form a concentrated phase. Some earlier articles explain the general principles of which we are aware are: "A Low-Energy Solvent Separation Method," by T. G. Gutowski et al, *Polymer Engineering and Science*, March 1983, Vol. 23, No. 4, pp. 230-237; "Lower Critical Solution Temperature Behavior of Ethylene Propylene Copolymers in Multicomponent Solvents" by C. A. Irani et al. in *Journal of Applied Polymer Science* (1986), Vol. 31, pp. 1879-1899; "Separating Polymer Solutions with Supercritical Fluids," by Mark A. McHugh et al. in *Macromolecules* 1985, Vol. 18, pp. 674-680; "Critical dynamics and phase separation kinetics in dynamically asymmetric binary fluids: New dynamic universality class for polymer mixtures or dynamic crossover?," by Hajime Tanaka in *Journal of Chemical Physics* 1 Apr. 1994, 100 (7), pp. 5323-5337; "Short Chain Branching Effect on the Cloud Point Pressures of Ethylene Copolymers in Subcritical and Supercritical Propane," by S. J. Han et al. in *Macromolecules* 1998, Vol. 31, pp. 2533-2538, each of which is incorporated herein by reference.

The finishing section may also comprise a vacuum devolatilizer, in which the molten polymer is exposed to a vacuum while being intensively agitated to draw off volatiles such as solvent and residual monomer, in order to reduce the level of volatiles in the finished polymer to a desired level.

U.S. Pat. No. 6,881,800 and U.S. Pat. No. 7,163,989, both of which are incorporated herein by reference, describe a process and apparatus for the continuous solution polymerization of olefins including ethylene, propylene and other olefin comonomers. The polymerization reaction takes place under pressure in one or more polymerization reactors, and then the effluent from the reactor or reactors is treated in a finishing section with a catalyst killer and then heated in one or more heat exchangers before being subject to a pressure drop which causes the effluent to phase separate into a polymer-rich phase and a polymer-lean phase. Those phases are separated, with the polymer-lean phase being purified and recycled to be used as solvent. The polymer-rich phase is subject to further separation and purification stages, including passage through a vacuum devolatilizer. Following the vacuum devolatilization, the polymer is formed into pellets and/or bales for storage or shipping. The process is suitable for the manufacture of a range of different polymer types.

While the single site, metallocene catalysts have a high activity; that activity is often sustained under conditions in which phase separation would occur at elevated temperatures. Continued polymerization activity during phase separation may influence polymer characteristics undesirably.

Many types of catalyst are known for olefin polymerization, including Ziegler-Natta, chromium catalysts and single site catalysts such as metallocenes. The use of single site catalysts is associated with poor solubility in the aliphatic hydrocarbon, saturated, non-polar solvents used for homogeneous solution polymerization. As a result, an aromatic catalyst solvent, such as toluene may have to be used. This in turn can complicate solvent separation to prevent toluene build up in the reactor, and lead to environmental pollution and added maintenance expenditure.

In some solution processes (see WO 98/02471 Kolthammer), incorporated herein by reference, the polymerized mixture is flashed off in two stages, whereby the solvent and unreacted monomer are converted to a vapor phase. Efficient extraction of solvent, etc., requires low vapor pressures and vapor phase compression or condensation followed by pumping for subsequent separation stages. Pumping is used to convey polymer from flash separation stages to a final devolatilizing extruder.

U.S. Pat. No. 3,912,698, incorporated herein by reference, uses a heat exchanger for a liquid recycle stream to permit an increase in reactor capacity while reducing fouling in the context of a multiple flash to remove volatiles.

Polymers prepared using continuous solution polymerization have found application as films. In such end uses, it is especially important to minimize the gel content of the polymer because gels give rise to imperfections in the films.

A stabilizer may be added to a polymer during manufacture or processing of a polymer to prevent oxidation on storage. A variety of stabilizers is available commercially.

There remains a need for an improved continuous solution process and plant which provides one or more of the following benefits: producing polymer economically across a broad range of operating windows including varying polymerization temperatures; producing a broad spectrum of polymers, particularly polymers of widely varying average molecular weights, molecular weight distributions, and/or comonomer contents; permitting the production of polymers having useful molecular weights at high temperatures (above 150° C.); accommodating a broad range of catalyst performance; reducing energy consumption, especially in finishing, and reducing environmental discharge; and reducing or avoiding fouling in the recycle and purification systems while using highly active metallocene type catalysts with unreacted monomer and temperature during separation processes.

It would be particularly useful to provide a process and plant which can introduce stabilizer into a polymer in an effective and efficient way, with minimal requirement for additional equipment and minimal operating costs.

For additional background, see also WO 94/00500 and WO 92/14766, incorporated herein by reference.

SUMMARY OF INVENTION

Provided is a plant for the continuous solution polymerization of a feed comprising one or more olefin monomers in a solvent, e.g., hydrocarbon solvent, in which the plant comprises means for separating solvent from the polymer including a flash tank and a vacuum devolatilizer. The plant also includes in a first aspect stabilizer addition means for adding a stabilizer to the concentrated polymer fines at a location downstream of the flash and upstream of the vacuum devolatilizer. In another aspect the plant comprises means to add a molten stabilizer to the polymer at a location downstream of the reactors.

DETAILED DESCRIPTION OF ILLUSTRATIVE EMBODIMENTS

In a first aspect, provided is a plant for the continuous solution polymerization of a feed comprising one or more olefin monomers and a solvent, e.g., hydrocarbon solvent, the plant comprising a reactor, means (one or more) to supply a feed of one or more olefin monomers in a solvent to the reactor and means to supply a catalyst to the reactor to form a polymer-containing polymerization reaction mixture, downstream of the reactor a liquid phase separator for separating the reaction mixture into a polymer-rich phase and a polymer-lean phase, downstream of the liquid phase separator a flash tank for separating the polymer rich phase into a vapour phase and a concentrated polymer phase, and downstream of the flash tank a vacuum devolatilizer for removing volatile components from the concentrated polymer phase, wherein the plant also includes stabilizer addition means for adding stabilizer to the concentrated polymer phase at a location downstream of the flash tank and upstream of the vacuum devolatilizer.

By adding the stabilizer to the polymer at a location upstream of the vacuum devolatilizer the stabilizer is intimately mixed into the concentrated polymer phase by the intensive mixing provided by the vacuum devolatilizer and therefore no additional mixing apparatus is required. Moreover, without being limited by theory, it is believed that leaks in the vacuum devolatilizer which allow atmospheric oxygen to be pulled into the devolatilizer chamber and combined with the concentrated polymer phase at high temperature results in some oxidation of the polymer and consequent formation of gels. By adding the stabilizer into the concentrated polymer phase upstream of the vacuum devolatilizer the polymer is protected to some extent from contact with oxygen in the devolatilizer. Accordingly, the plant of the first aspect provides an efficient and effective means of adding stabilizer to the polymer and may reduce gel formation in the vacuum devolatilizer.

Optionally the stabilizer is a molten stabilizer. Optionally, the stabilizer is in solution in a solvent. For example, the stabilizer may be in solution in a solvent, e.g., hydrocarbon solvent.

The solvent is a conventional hydrocarbon solvent or a conventional non-hydrocarbon solvent. Preferably, the solvent is a hydrocarbon solvent. More preferably, the solvent is mixed hexanes. Still more preferably, the solvent is isohexane.

Preferably, the plant also comprises a pump, for example, a gear pump located downstream of the flash tank and upstream of the devolatilizer and the stabilizer addition means is arranged to introduce the stabilizer into the concentrated polymer phase at a rate which is controlled in relation to the speed of the gear pump. In that way, the rate of addition of stabilizer into the concentrated polymer phase is controlled in relation to the rate of flow of the concentrated polymer phase so as to maintain an approximately constant concentration of the stabilizer in the polymer. Preferably, the pump is arranged to operate in response to the level of concentrated polymer phase in the flash tank to thereby maintain a desired level of concentrated polymer phase in that flash tank. Preferably, the stabilizer is introduced into the concentrated polymer phase downstream of the gear pump.

In a second aspect, provided is a plant for the continuous solution polymerization of a feed comprising one or more olefin monomers and a solvent, the plant comprising: a reactor, means (one or more) to supply a feed of one or more olefin monomers in a solvent to the reactor and means to supply a catalyst to the reactor to form a polymer-containing polymerization reaction mixture, downstream of the reactor a liquid phase separator for separating the reaction mixture into a polymer-rich phase and a polymer-lean phase, downstream of the liquid phase separator a flash tank for separating the polymer rich phase into a vapour phase and a concentrated polymer phase, and downstream of the flash tank a vacuum devolatilizer for removing volatile components from the concentrated polymer phase, wherein the plant also includes stabilizer addition means for adding a molten stabilizer to the polymer at a location downstream of the reactor.

In a third aspect, provided is a method of continuously polymerizing a feed comprising one or more olefin monomers and a solvent which includes the steps of: combining the feed in a reactor with a catalyst to form a polymer containing polymerization reaction mixture, separating the polymer-containing polymerization reaction mixture, downstream of the reactor, into a polymer-rich liquid phase and a polymer-lean liquid phase, separating the polymer-rich phase from the polymer-lean phase and exposing the polymer-rich phase to a pressure reduction to cause flashing of the polymer-rich phase to form a solvent-containing vapour phase and a concentrated polymer phase, separating the concentrated polymer phase from the solvent-containing vapour phase and exposing the concentrated polymer phase to a vacuum to further reduce the concentration of volatile components in the concentrated polymer phase, and cooling and pelletizing the polymer to form polymer pellets, in which a molten stabilizer is added to the polymer at a location downstream of the reactor.

Conventionally, stabilizer is added to polymer during polymer manufacture in the form of a solution, for example, the stabilizer may be used as a solution in hexane or toluene. In contrast, in the plant and method of the second and third aspects the stabilizer is used in molten form and typically comprises less than 10%, preferably less than 5%, preferably less than 1 wt % of solvent. The term molten stabilizer refers to a stabilizer, or a mixture of stabilizers, which has been heated to above its melting point and has as a consequence melted. In the second and third aspects, the stabilizer may be added to the polymer at any location downstream of the reactor, in contrast to the plant of the first aspect. However, in the second and third aspects, the stabilizer is preferably added to the polymer at a location downstream of the flash tank and upstream of the vacuum devolatilizer.

The use of molten stabilizer as opposed to a solution of stabilizer avoids the addition of further solvent to the mixture, thereby decreasing the burden on the solvent separation system and possibly reducing the chance of inadvertently introducing contaminants into the recycled solvent stream.

Optionally, in the third aspect the stabilizer addition means is arranged to introduce a molten stabilizer into the polymer rich phase at a location between the liquid separator and the flash tank. Optionally, in the third aspect the stabilizer addition means is arranged to introduce a molten stabilizer into the flash tank.

Optionally, the stabilizer addition means is arranged to introduce a molten stabilizer into the concentrated polymer phase downstream of the flash tank.

Optionally, the molten stabilizer is combined with the concentrated polymer phase following its separation from the solvent-containing vapour phase.

Optionally, the stabilizer addition means is arranged to introduce a molten stabilizer into the concentrated polymer phase upstream of the vacuum devolatilizer. Optionally, the molten stabilizer is combined with the concentrated polymer phase upstream of the vacuum devolatilizer. In that way, the stabilizer is mixed with the concentrated polymer phase by the agitator of the devolatilizer.

Optionally, the plant also comprises a gear pump located downstream of the flash tank and upstream of the devolatilizer and the stabilizer addition means is arranged to introduce the molten stabilizer into the concentrated polymer phase at a rate which is controlled in relation to the speed of the gear pump. Optionally, the stabilizer addition means is arranged to add stabilizer to the concentrated polymer phase at a rate which is directly proportional to the speed of the gear pump. Optionally, the molten stabilizer is introduced into the concentrated polymer phase downstream of the gear pump.

In the plant of the first and second aspects and in the method of the third aspect, the stabilizer addition means can be any apparatus suitable for adding the stabilizer to the concentrated polymer phase. The stabilizer addition means will typically comprise a pump for pumping the stabilizer into the concentrated polymer phase at a suitable location, for example, into a conduit through which the concentrated polymer phase flows. Optionally, the stabilizer addition means comprises a stabilizer storage vessel, heating means to heat the stabilizer storage vessel, and a metering pump to pump molten stabilizer from the stabilizer storage vessel and into a conduit located downstream of the reactor. Preferably, the stabilizer is shipped to the plant in large shipping containers, for example, containers having a capacity of 10 m$^3$ or more. Optionally, the plant comprises means to heat a shipping container to melt stabilizer contained therein and connection means to connect the shipping container to the stabilizer storage vessel for transfer of the molten stabilizer from the shipping container to the stabilizer storage vessel. The means to heat the shipping container may be, for example, a steam heating system. The connection means may be any suitable arrangement of conduits and connectors. Optionally, the shipping container is an Isotainer.

Optionally, the molten stabilizer comprises a mixture of more than one stabilizer. Alternatively, the molten stabilizer comprises only one stabilizer.

Optionally, the stabilizer has a melting point in the range of from 40° C. to 200° C., for example, in the range of from 50° C. to 150° C.

Optionally, the stabilizer used in the first, second and third aspects described herein comprises a phenolic stabilizer. Optionally, the stabilizer comprises a phosphite stabilizer. Optionally, the stabilizer comprises both a phenolic stabilizer and a phosphate stabilizer. The skilled person will be aware of many suitable stabilizers. Preferred stabilizers include the Irganox™ and Irgafos™ stabilizers from Ciba. Preferably, the stabilizer comprises octadecyl-3-(3,5-di-tert-butyl-4-hydroxyphenyl)-proportionate, (Irganox 1076), tris(2,4-ditertbutylphenyl)phosphate (Irgafos 168), bis(2,4-ditertbutyl-6-methylphenyl)-ethyl-phosphite (Irgafos 38) or a mixture thereof. Irganox 1076 is a preferred stabilizer.

Optionally, the molten stabilizer is added to the polymer in an amount sufficient to give a concentration of stabilizer in the polymer pellets in the range of from 200 to 2000 ppm, preferably from 400 to 1100 ppm.

Optionally, the method of the third aspect is carried out using the plant of the second aspect.

The above-described embodiments are described in further detail.

The means to supply a feed of one or more olefin monomers in a solvent may be any suitable apparatus but will typically include a conduit for the supply of each of the monomers to a common feed conduit, a conduit for the supply of recycled solvent, a conduit for the supply of fresh solvent and a pump or pumps for pumping the feed to the reactor or reactors, and for pressurizing the feed to the desired pressure.

The reactor arrangement may be single reactor or a plurality, preferably two, reactors arranged in series, or less preferably in parallel. The or each reactor is optionally a continuous stirred tank reactor.

By raising the pressure, for example, to above 20 bar or optionally above 75 bar, the formation of two-phase conditions is avoided in the reactor arrangement and heating arrangement under a wide range of temperature and polymerization conditions. Hence a wide variety of catalysts can be used in the process. Such a wide range of catalysts can be used to make high and/or low average molecular weight materials under optimized production conditions. Use of a separate pump to boost the pressure of the viscous polymerization mixture between the reactor and the liquid phase separator can be avoided, [such pumps are much more costly than the low viscosity feed pump]. The pressure of the pump also cascades through the process and combines with the absence of vaporization for the initial solvent separating stage to reduce overall pumping needs during finishing. The pressure of the pump advances the viscous polymerization mixture to the pressure reducing means upstream of the liquid phase separator without allowing phase separation prior to the pressure reducing means. In a preferred form of the processes and apparatuses described herein, the pressure of the pump additionally advances one or both separated phases to further downstream fractionating systems or purification devices such as high pressure flash separation devices or low pressure flash separating devices.

Preferably, a catalyst killer is added downstream of the reactor or reactors (in the case of series reactors that means that the killer is added downstream of the last polymerization reactor) and upstream of a heating arrangement and the liquid phase separator to suppress further polymerization of the heated polymerization mixture undergoing separation, the lean phase being passed through a cooling apparatus, which may comprise a heat integrating exchanger and a final cooler, and optionally a drier back to the inlet side of the pump; the polymer-rich phase being subjected to additional solvent removal downstream to obtain a solid polymer.

The addition of the catalyst killer permits the temperature to be increased without risking further polymerization so facilitating direct recycle, after removal of any surplus killer, of separated solvent and monomer to the feed supply means on the inlet side of the pump. With term "direct" is meant that the lean phase generally does not need to be fractionated.

Preferably, energy consumption per unit polymer produced is low, with simple solvent recovery and energy integration systems [such as heat integrating exchanger], which can be employed to minimize discharges to atmosphere and to recover heat from the effluent on the liquid phase separator.

The term "liquid phase separator" refers to an apparatus in which a liquid mixture is exposed to conditions under which it separates into two liquid phases.

Preferably, the liquid phase separator is connected to the flash tank, arranged downstream, which receives the polymer-rich phase from the liquid phase separator. Preferably a the flash tank operates at a pressure sufficient to allow feeding of the vapor phase to the fractionating and purification system without requiring a separate compressor, and said pressure is generally 2 bar gauge or more. In order to accommodate production of polymers with a wide range of molecular weights, this pressure in the flash tank can be raised to a high level, between 3 and 20 barg, to adjust solution viscosity to facilitate feeding of the concentrated polymer solution to the final devolatizing stage. Thus the volatile phase removed from a polymer-rich phase is optionally conveyed simply to a fractionating tower as a vapor, arranged downstream of the flash tank, for purification.

In one embodiment the lean phase is passed in liquid form to a means for removing hydrogen added to or generated during polymerization, which means comprises a means for contacting a stripping vapor with the lean phase in a countercurrent flow arrangement to concentrate the hydrogen in the vapour phase for removal from the lean phase recycle.

Optionally, the plant of the first and second aspects and the method of the third aspect of the apparatus comprises more than one flash tank. In that event, references herein to the stabilizer addition location being downstream of the flash tank should be understood to mean downstream of the most downstream flash tank.

Downstream of the liquid phase separator, the polymer-rich phase enters a flash tank operating at a pressure such that solvent and residual monomer vaporizes to leave a concentrated polymer phase. The concentrated polymer phase will usually comprise at least 70 wt % of polymer. The vapour is separated as an overhead stream from the flash tank and the concentrated polymer phase typically is collected in the bottom of the flash tank from where it passes through an outlet into a conduit and eventually flows to the vacuum devolatilizer. In the plant of the first aspect, and in a preferred embodiment of the second and third aspects, the stabilizer is added to the concentrated polymer phase at a location between the flash tank and the vacuum devolatilizer.

The plant preferably comprises a pump such as a gear pump for withdrawing the concentrated polymer phase from the flash tank and pumping it to the inlet of the devolatilizer.

The term 'vacuum devolatilizer' refers to a device in which the concentrated polymer phase is exposed to a vacuum whilst being agitated to expose new surface area, thereby causing further residual solvent and monomer to evaporate and be drawn off.

The level of volatiles (typically residual solvent and monomer), present in the concentrated polymer phase immediately downstream of the flash tank is optionally less than 30 wt %, preferably less than 10 wt %. The level of volatiles in the polymer immediately downstream of the devolatilizer is preferably no more than 0.5 wt %, preferably no more than 0.25 wt %.

The pressure in the vacuum devolatilizer is preferably no more than 55 mmHg, preferably no more than 30 mmHg. The temperature is optionally in the range of from 150° C. to 270° C.

Preferably, the process uses a non-polar solvent which does not coordinate or interfere in a meaningful way so as to inhibit the catalytic action of the catalyst system. Preferably the process uses a low boiling, alkane based solvent, optionally mixtures of alkanes, which may be linear or branched, such as those having from 4 to 10 carbon atoms, preferably in the range of 5-7 carbon atoms, optionally in admixture with other alkanes of a higher or lower molecular weight. The solvent is preferably a hexane.

The polymer may be derived of monomers predominantly comprising mono-olefins such as ethylene or propylene or other higher alpha-olefins having from 4 to 10 carbon atoms. This combination provides a mixture which can be easily separated inside the liquid phase separator.

Considerable energy can be preserved by providing that the polymerization mixture from the reactor is heated to the temperature before reaching the separator successively by an upstream heat integration exchanger and a downstream trim heat exchanger and by providing that the lean phase from the separator is used to supply heat to the upstream one of said heat exchangers.

Working pressures in the process described herein can be 80 bar or more, 90 bar or more; 95 bar or more and especially 120 bar or more, or even 140 bar or more. The upper pressure limit is not critically constrained but typically can be 200 bar or less, preferably 140 bar or less, or 120 bar or less. The pressure should suffice to keep the reactor solution in a single phase up to the point of the pressure reducing means, and to provide the necessary working pressure to convey the fluids through the plant.

The feed temperature may vary depending on the available exotherm and extent of monomer conversion desired to reach the polymerization temperature. Advantageously the temperature is no higher than 40° C., optionally no higher than 20° C., optionally no higher than 0° C., optionally no higher than −20° C., and is optionally less than −20° C., for example, in the range of from −20° C. to −40° C. The polymerization temperature is constrained by the molecular weight desired, allowing for the influence of any chain transfer agent, for example, hydrogen added. In a series reactor process the temperature in the successive reactors can be raised progressively in increments depending on the nature of the polymerization taking place in such reactors. Advantageously, the polymerization temperature for polymers comprising predominantly ethylene derived units is at least 100° C., preferably at least 150° C. or even (for lower molecular weight materials) 200° C. or more. The temperature should not exceed the polymerization decomposition temperature or the temperature at which the catalyst can sustain the polymerization reaction.

Overall the exotherm may lead to a temperature differential between the inlet temp of the polymerization reactor and the outlet of from 50° C. to 220° C. or up to 250° C. For example, by feeding at minus 40° C. and allowing the exotherm to raise the temperature to 210° C., a highly efficient process may result for producing lower molecular weight polymers. For higher molecular weight polymers, the temperature rise may need to be constrained via warmer feed and/or lower reactor temperatures to avoid excessive viscosity in the reactor solution that would degrade reactor mixing performance, thereby leading to non-uniform polymers.

Monomer concentration depends on the target polymer type and molecular weight, the associated conversions of monomer to polymer and operating temperature. Advantageously, the monomer concentration should be 10 wt % or more; especially 15 wt % or more, and should preferably not exceed 80 wt %, 70 wt % or especially 60 wt %. The total vapor pressure of all components should be less than 100 wt % of the reactor pressure at the stream temperature to avoid formation of vapor bubbles. In general, higher monomer concentrations are preferred to improve the liquid phase separation in the liquid phase separator.

In its broadest form, the invention(s) described herein can be performed with any suitable catalyst, for example, a Ziegler Natta catalyst or a SSC (single sited catalyst). Preferably, a SSC is used. These generally contain a transition metal of Groups 3 to 10 of the Periodic Table; and at least one ancillary ligand that remains bonded to the transition metal during polymerization. Preferably, the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The catalyst is preferably a bulky ligand transition metal catalyst. The "bulky ligand" contains a multiplicity of bonded atoms, preferably carbon atoms, forming a group, which may be cyclic with one or more optional hetero-atoms. The bulky ligand may be metallocene-type cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group 4, 5 or 6 transition metal of the Periodic Table of Elements. The transition metal atom is preferably a Group 4 atom.

Metallocene catalysts can be used with a cocatalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

The SSC should preferably be selected from among a broad range, of available SSC's, to suit the type of polymer being made and the process window associated therewith in such a way that the polymer is produced under the process conditions at an activity of at least 40,000 g polymer per gram SSC (such as a metallocene), preferably at least 60,000 or even in excess of 100,000 g polymer per g SSC. By enabling the different polymers to be produced in different operating windows with an optimized catalyst selection, the SSC and any ancillary catalyst components can be used in small quantities, with optionally also using small amounts of scavengers. The killer can be used in equally small amounts and the various cost-effective methods can then be introduced to allow the non-polar solvent to be recycled and subjected to treatment to remove polar contaminants before re-use in the polymerization reactor(s).

A metallocene may be also be used with a cocatalyst which is a non- or weakly coordinated anion (the term non-coordinating anion as used herein includes weakly coordinated anions. The coordination should be sufficiently weak in any event, as evidenced by the progress of polymerization, to permit the insertion of the unsaturated monomer component.) The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP 0277003 and EP 0277004, incorporated herein by reference. The precursor cation may be a triphenylcarbonium derivative.

The non-coordinating anion can be a halogenated, tetra-aryl-substituted Group 10-14 non-carbon element-based anion, especially those that have fluorine groups substituted for hydrogen atoms on the aryl groups, or on alkyl substituents on those aryl groups.

The effective Group 10-14 element cocatalyst complexes are, in a preferable embodiment, derived from an ionic salt, comprising a 4-coordinate Group 10-14 element anionic complex, where A⁻ can be represented as:

$$[(M)Q_1Q_2 \ldots Q_i]^-,$$

where M is one or more Group 10-14 metalloid or metal, preferably boron or aluminum, and each Q is a ligand effective for providing electronic or steric effects rendering $[(M')Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof.

The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

$$L^A L^B L^C_i MDE$$

where, $L^A$ is a substituted cyclopentadienyl or hetero-cyclopentadienyl ancillary ligand π-bonded to M; $L^B$ is a member of the class of ancillary ligands defined for $L_A$, or is J, a hetero-atom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

Representative non-metallocene transition metal compounds usable as SSC's also include tetrabenzyl zirconium, tetra bis(trimethylsiylmethyl)zirconium, oxotris(trimethlsilylmethyl)vanadium, tetrabenzyl hafnium, tetrabenzyl titanium, bis(hexamethyl disilazido)dimethyl titanium, tris(trimethyl silyl methyl)niobium dichloride, and tris(trimethylsilylmethyl)tantalum dichloride.

Additional organometallic transition metal compounds suitable as olefin polymerization catalysts in accordance with the aspects described herein will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred, are metallocenes which are biscyclopentadienyl derivatives of a Group 4 transition metal, preferably zirconium or hafnium, for example, as disclosed in WO 99/41294 incorporated herein by reference. These may advantageously be derivatives containing a fluorenyl ligand and a cyclopentadienyl ligand connected by a single carbon and silicon atom, for example, as disclosed in WO 99/45040; and WO 99/45041, both of which are incorporated herein by reference. More preferably, the Cp ring is unsubstituted and/or the bridge contains alkyl substituents, suitably alkylsilyl substituents to assist in the alkane solubility of the metallocene, for example, as disclosed in WO 00/24792 and WO 00/24793, both of which are incorporated herein by reference. Other possible metallocenes include those in WO 01/58912, incorporated herein by reference.

Dow in EP 0418044, incorporated herein by reference, discloses a monocyclopentadienyl compound similar that of EP 0416815. Similar compounds are described in ExxonMobil EP 0420436. Sumitomo in WO 97/03992, incorporated herein by reference, shows a catalyst in which a single Cp species and a phenol are linked by a C or Si linkage, such as Me₂C(Cp)(3-tBu-5-Me-2-phenoxy)TiCl₂. Nova in WO 2001/05849, incorporated herein by reference, discloses Cp-phosphinimine catalysts, such as (Cp)((tBu)₃P═N—)TiCl₂.

Other suitable metallocenes may be bisfluorenyl derivatives or unbridged indenyl derivatives which may be substituted at one or more positions on the fused ring with moieties which have the effect of increasing the molecular weight and so indirectly permit polymerization at higher temperatures such as described in EP 0693506 and EP 0780395, both of which are incorporated herein by reference.

When using the catalysts described above, the total catalyst system will generally additionally comprise one or more organometallic compounds as scavenger. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically, these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941, each of which are incorporated herein by reference. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds is minimized during polymerization reactions to that amount effective to enhance activity (and with that amount necessary for activation of the catalyst compounds if used in a dual role) since excess amounts may act as catalyst poisons.

The process and the plant used in the process are designed as explained above to permit polymerization of a wide variety of polymer types and molecular weights. Generally speaking the polymers are derived from either ethylene or propylene as the dominant (more than 50 mol %) component. Polymers may preferably contain from 5 to 40 mol % of comonomer to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units) 1-butene, 1-hexene, 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units.

In the case of plastomer, the polymer which may be produced include the following aspects: Preferably, the comonomer is an alpha-olefin having from 3 to 15 carbon atoms, more preferably 4 to 12 carbon atoms and more preferably 4 to 10 carbon atoms. Ethylene can be polymerized with at least two comonomers to form a terpolymer. Monomer is generally polymerized in a proportion of 70.0-99.99, preferably 70-90 and more preferably 80-95 or 90-95 mol % of ethylene with 0.01-30, preferably 3-30 and more preferably 5-20 mol % comonomer. For the purposes of this patent specification the molecular weight distribution of a polymer can be determined with a Waters Gel Permeation Chromatograph equipped with Ultra-styrogel 5 columns and a refractive index detector. The operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers produced in this embodiment are termed "narrow" that is to say an $M_w/M_n$ less than 3, preferably less than or equal to 2.5. The MI of the polymers are generally in the range of 0.01 dg/min to 200 dg/min, preferably 0.1 dg/min to 100 dg/min, more preferably 0.2 to 50 dg/min and more preferably less than 10 dg/min. Contemplated densities of the plastomers are in the range of 0.85 to 0.93 $g/cm^3$, preferably 0.87 to 0.92 $g/cm^3$, and more preferably 0.88 to 0.91 $g/cm^3$.

The processes described herein may be especially concerned with copolymerization reactions involving the polymerization of one or more of the monomers, for example alpha-olefin monomers of ethylene, propylene, 1-butene, 1-pentene, 1,4-methyl-1-pentene, 1-hexene, 1-octene, 1-decene and cyclic olefins such as styrene. Other monomers may include polar vinyl, dienes, norbornene, acetylene and aldehyde monomers.

In the case of elastomers, the polymer which may be produced include terpolymers of an ethylene-α-olefin-EODE (Ethylene-alpha-Olefin-Diene Elastomer) of high $M_w$ and greater than 0.3 wt % diene content, preferably greater than 2.0 wt % diene content. These polymers may be largely amorphous and have a low or zero heat of fusion. As used herein the term "EODE" encompasses elastomeric polymers comprised of ethylene, an α-olefin, and one or more non-conjugated diene monomers. The non-conjugated diene monomer may be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 up to 90 wt % ethylene, more preferably 30 to 85 wt % ethylene, and more preferably 35 to 80 wt % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 to 80 wt %, more preferably at 20 to 65 wt %. The non-conjugated dienes are generally incorporated into the EODE at 0.5 to 20 to 35 wt %; more preferably at 1 to 15 wt %, and more preferably at 2 to 12 wt %. If desired, more than one diene may be incorporated simultaneously, for example HD and ENB, with total diene incorporation within the limits specified above.

The elastomers may also be devoid of a diene and be a copolymer of two monomer types. Such copolymers may be elastomers of high $M_w$, low crystallinity, and low ash. The copolymers may be ethylene-alpha-olefin copolymers (EPC) of high $M_w$. As used herein the term "EPC" means a copolymer of ethylene and an alpha-olefin, not necessarily propylene, which exhibits the properties of an elastomer. The alpha-olefins suitable for use in the preparation of elastomers with ethylene are preferably $C_3$ to $C_{10}$ alpha-olefins. Illustrative non-limiting examples of such alpha-olefins are propylene, 1-butene, 1-pentene, 1-hexene, 1-octene and 1-dodecene. If desired, more than one alpha-olefin may be incorporated. The EPC elastomers may contain 20 up to 90 wt % ethylene, more preferably 30 to 85 wt % ethylene, and more preferably 35 to 80 wt % ethylene.

In the case of polymers derived predominantly from propylene derived units, the polymers have the following features as a result of the presence of isotactic polypropylene sequences in the chain.

In one embodiment, a copolymer of propylene and at least one comonomer, the comonomer being ethylene or an alpha-olefin. Comonomers include ethylene and linear or branched $C_4$ to $C_{30}$ alpha-olefins, or combinations thereof. Preferred linear alpha-olefins include ethylene and $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene. The propylene copolymer is preferably a random copolymer, as the term is defined herein below.

The polypropylene copolymer has a crystallinity of from 2% to 65%. Within this range of crystallinity, alternative lower limits of crystallinity can be 5% or 10%, and alternative upper limits of crystallinity may be 50%, 45% or 40%.

The crystallinity of the polypropylene copolymer is derived from isotactic (or alternatively syndiotactic) polypropylene sequences in the copolymer. The amount of propylene may be from 65 wt % to 95 wt %. Within this range, alternative lower limits of propylene content may be 70 wt % or 80 wt %, and alternative upper limits of propylene content can be 92.5 wt %, 90 wt %, or 89 wt %.

The semi-crystalline polypropylene copolymer necessarily has a non-zero heat of fusion, due to the measurable crystallinity. The crystallinity may be calculated from the heat of fusion, using a preferred value of 189 J/g for 100% crystallinity and a linear relationship between heat of fusion and crystallinity; see, B. Wunderlich, *Macromolecular Physics*, vol. 3, Academic Press (1980), esp. Chapter 8.4.2, incorporated herein by reference.

The polypropylene copolymer preferably has a single broad melting transition. Typically, a sample of the polypropylene copolymer will show secondary melting peaks or shoulders adjacent to the principal peak, and this combination is considered together as single melting point, i.e., a single broad melting transition. The highest of these peaks is considered the melting point. The polypropylene copolymer preferably has a melting point of from 25° C. to 110° C. Within this range, alternative lower limits of the melting point may be 30° C. or 35° C., and alternative upper limits of the melting point may be 105° C. or 90° C.

The weight average molecular weight of the polypropylene copolymer can be from 10,000 to 5,000,000 g/mol, preferably 80,000 to 500,000. The MWD ($M_w/M_n$) is preferably above 2. The MWD ($M_w/M_n$) may be less than 40, more preferably less than 5 and more preferably less than 3. In another embodiment, it is preferred that the polypropylene copolymer has a ML (1+4)@125° C. less than 100, more preferably less than 75, even more preferably less than 60, and more preferably less than 30.

The polypropylene copolymer preferably is a random, crystallizable copolymer having a narrow compositional distribution. The intermolecular composition distribution of the polymer is determined by thermal fractionation in a solvent. A typical solvent is a saturated hydrocarbon such as hexane or heptane. The thermal fractionation procedure is described below. Typically, approximately 75 wt % and more preferably 85 wt % of the polymer is isolated as one or two adjacent, soluble fractions, with the balance of the polymer in immediately preceding or succeeding fractions. Each of these fractions has a composition (wt % ethylene content) with a difference of no greater than 20% (relative) and more preferably no greater than 10% (relative) from the average weight % ethylene content of the polypropylene copolymer. For purposes of the present disclosure, the polypropylene copolymer is considered to have a "narrow" compositional distribution if it meets the fractionation test outlined above.

The length and distribution of stereoregular propylene sequences in preferred polypropylene copolymers is consistent with substantially random statistical copolymerization. It is well known that sequence length and distribution are related to the copolymerization reactivity ratios. As used herein, the term "substantially random" means a copolymer for which the product of the reactivity ratios is generally 2 or less. In contrast, in stereoblock structures, the average length of PP sequences is greater than that of substantially random copolymers with a similar composition. Prior art polymers with stereoblock structure have a distribution of PP sequences consistent with these "blocky" structures rather than a random, substantially statistical distribution.

The reactivity ratios and sequence distribution of the polymer may be determined by C-13 NMR, which locates the ethylene residues in relation to the neighboring propylene residues. To produce a crystallizable copolymer with the required randomness and narrow composition distribution, it is desirable to use: (1) a single-sited catalyst; and (2) a well-mixed, continuous flow, stirred tank polymerization reactor which allows only a single polymerization environment for substantially all of the polymer chains of preferred polypropylene copolymers.

Preferred propylene-ethylene copolymers are described in U.S. Pat. No. 6,635,715, incorporated herein by reference.

As general guidance when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 20 bar/second, preferably 30 bar/second or more, more preferably 40 bar/second or more, even more preferably 50 bar/second or more, assists in inducing disengagement of the two phases. This rapid pressure decrease preferably starts from a pressure above the binodal boundary or LSCT and stops at a pressure below the spinodal boundary. The preferred phase separation is by spinodal decomposition and is called pressure induced phase separation (PIPS). Also the liquid phase separator should provide a sufficient residence time to permit the settlement of the lean and concentrated phase at the lower end of the separator.

Molecular weight control may be exercised through control of hydrogen levels, which may be supplementary to control of molecular weight by control of the polymerization temperature.

The lean phase may be passed in liquid form to a means for removing hydrogen added to or generated during polymerization, which means comprises a means for contacting a stripping vapor with the lean phase in a countercurrent flow arrangement to concentrate the hydrogen in the vapour phase for removal from the lean phase recycle.

The stripping vapor preferably consists of a volatile monomer such as ethylene. Optionally an inert gas, such as nitrogen, may be used. The means may include a stripping vessel to remove hydrogen from the recovered solvent stream for use as the polymerization feed. The stripping vapor advantageously has a low hydrogen content, preferably below 5 mppm. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel without the aid of separate additional compression.

This embodiment is especially applicable to plant lay-outs where reactors are arranged to operate in series and where the upstream reactor is operated under no or low hydrogen conditions to provide a higher molecular weight fraction and where hydrogen is added to a downstream reactor to provide a lower molecular weight fraction.

EXAMPLE

Figure 1:
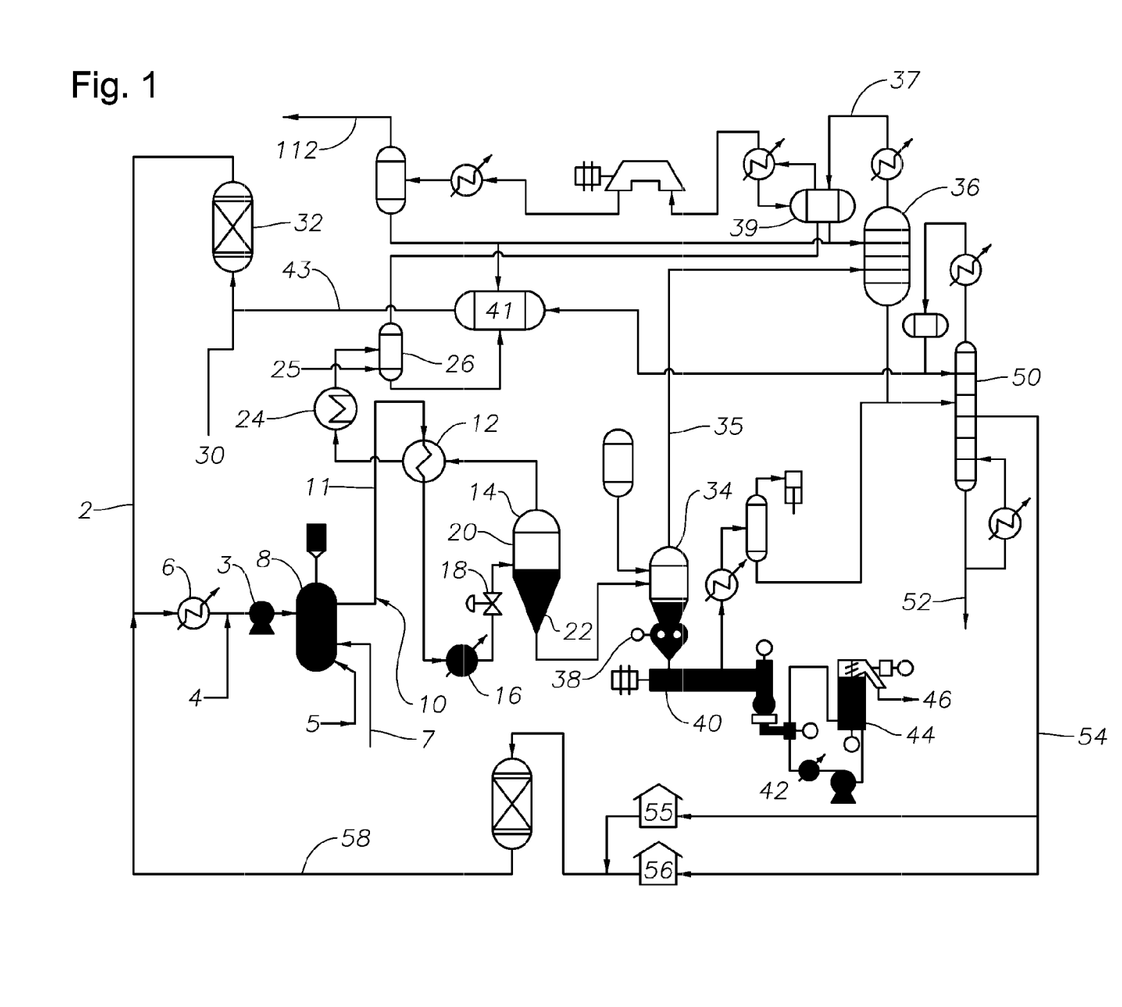
FIG. 1 shows a schematic lay-out of a plant according to an embodiment and a process flow according to an embodiment of the plant.

Embodiments are described below and in the Figures.
With reference to FIG. 1 the plant is arranged as follows:
Polymerization and Initial Separation of Polymer and Solvent
A feed for polymerization is passed through conduit 2 by a centrifugal pump 3. The feed contains: A) isohexane as solvent, B) monomer, generally the predominant monomer is ethylene or propylene, and optionally C) comonomer which may be any copolymerizable alpha-olefin, and optionally D) a diene or other polyene or cyclic copolymerizable material. The feed is passed through a chiller or cooler 6 in which the feed is optionally chilled to a low temperature for subsequent adiabatic polymerization in the two continuous stirred tank reactors 8 which are operated in series or parallel (for simplicity, only one reactor is depicted in FIG. 1). Activator and metallocene catalyst may be premixed and added at 5 and/or 7 to one or both reactors 8. A scavenger, generally in the form of an alkyl aluminum such as tri-isobutyl aluminum or tri-n-octyl aluminum is added at 4 to minimize the impact of poisons in the feed and in the reactor on the catalyst activity.

To complement the molecular weight control provided by controlling the polymerization temperature, hydrogen may be added to one or both reactors through conduits (not shown).

The polymer-containing polymerization mixture, which emerges from the reactors 8 through a conduit 11, is first treated with a catalyst killer, preferably water or methanol, added at 10 neat or in a molecular solution in isohexane solvent to terminate the polymerization reaction. A heat exchanger 12 is arranged as part of a heat integrating arrangement and heated by a lean phase emerging from an upper layer 20 in a liquid phase separator 14, and provides an initial increase in the temperature of the polymer solution in the conduit 11. A trim heat exchanger 16, operating by using steam, hot oil or other high temperature fluid, further increases the temperature to a level suitable for liquid phase separation. The solution then passes through a let down valve 18 where a pressure drop is created which causes the separation of the polymer solution and settlement into the lean phase 20 and a polymer rich phase 22 below it.

It is important to note that no energy consuming pump is required to provide a pressure increase in the conduit 11 between the reactors 8 and the separator 14 as the polymer-containing polymerization mixture is propelled by the pressure from the pump 3.

Treatment of Lean Phase

The lean phase 20, after being cooled by the heat exchanger 12, aforementioned, is cooled further by a cooling device 24, passed through a surge tank 26 adapted for stripping out the hydrogen and then submitted to in-line chemical analysis at 43 to determine the concentration of monomer and comonomer in the solvent. This cooled lean phase 43 is combined with fresh feed of solvent and monomer 30 to provide the desired concentrations and then passed through a drier 32 which serves to remove any unreacted water used as the catalyst killer or present in the fresh feed supplied or any impurity in the recycled solvent and monomer as will be explained.

The surge tank 26 is arranged in the form of a vessel 26 suitable for stripping out hydrogen by means of ethylene as a stripping vapor 25 as is shown in FIG. 3 of U.S. Pat. No. 6,881,800, incorporated herein by reference.

The vapor from vessel 26 is routed to the reflux drum 39 of tower 36. Partly it is processed to recover valuable components, principally volatile monomers such as ethylene and propylene, by fractionating tower 36 and its overhead vapor compression/condensation system for recycling through conduit 43 to the inlet side of the drier 32. The part mainly comprising hydrogen and any other non-condensables may be flared at 112.

A less preferred alternative is for part of the lean phase recycle to be flashed in a single stage flash vessel without the addition of stripping vapor. This, however, only permits limited hydrogen removal and detracts from the benefit of recycling the lean phase in its liquid state without energy intensive evaporation processes.

In single reactor and in series reactor arrangements using metallocene catalysts systems varying amounts of hydrogen may be produced by beta-hydride abstraction, even when no hydrogen is injected into the reactor. The amount may vary with metallocene selected. Its molecular weight reducing effect may be accommodated by appropriate selection of the reactor operating temperature. A substantial amount of this hydrogen may remain unreacted in the polymer-containing polymerization mixture stream 11. Reducing the amount of hydrogen recycled in this stream in the manner described above may be is advantageous to permit adjustment of the molecular weight independent of the polymerization operating temperature by removal of the generated hydrogen or by addition of hydrogen from an external source, generally in the feed conduit 2.

In series reactor operation as described herein, the ability to remove hydrogen may be exploited advantageously to widen the molecular weight split between the reactors and to broaden the molecular weight distribution beyond what would otherwise be possible. The feed supplied to the upstream reactor can have a hydrogen content below that which would prevail if hydrogen generated by beta hydride elimination remained in the recycle. Additional extraneous hydrogen may be added to the downstream reactor to provide a hydrogen content above that which would remain if hydrogen from beta hydride elimination were to remain in the recycle.

Treatment of Polymer Rich Phase

The concentrated polymer rich phase is passed to a low-pressure separator in the form of flash tank 34 where evaporated solvent and monomer are separated from the polymer-rich phase emerging from the liquid phase separator 14.

The evaporated solvent and monomer phase is passed through conduit 35 in a vapor phase to the purification tower 36 operating by distillation to separate a light fraction of the highly volatile solvent and unreacted ethylene and propylene on the one hand and heavier less volatile components such as hexane and any toluene used to dissolve catalyst or activator and unreacted diene type comonomers on the other hand. Use of toluene may be reduced under appropriate circumstances by a suitable selection of catalyst components and catalyst preparation conditions such as increases in catalyst solution temperature to increase the solubility of the catalyst components to reach a point where so little toluene is present that no separate process for the removal of the toluene are required.

A gear pump 38 conveys the concentrated polymer phase through a short conduit to a vacuum devolatilizing extruder or mixer 40. Molten stabilizer is injected into the short conduit at injection point 38a from the stabilizer addition apparatus shown in FIG. 2. The mixed stream of concentrated polymer phase and stabilizer enters the inlet of vacuum devolatilizer 40. The devolatilizer 40 comprises a large horizontal cylindrical chamber inside which is mounted on a horizontal stirring shaft which extends over the length of the chamber and is driven by a motor outside the chamber. The stirrer shaft is provided with a number of paddles which agitate the concentrated polymer phase as it flows along the chamber thereby both assisting the removal of volatiles from the polymer by continuously exposing new surface, and also mixing the stabilizer and polymer.

A vacuum is applied through a port in the upper part of the devolatilizer chamber where again a vapor phase is drawn off for purification, condensed and then pumped to a purification tower 50. A heavy fraction of toluene used as catalyst solvent and diene such as ethylene norbornadiene (ENB) comonomer or 1-octene comonomer are recovered by this purification tower 50. The ENB or octene may be recycled through outlet 54. Alternative heavy comonomers, such as ENB and octene, may thereby be stored in separate storage vessels 55, 56, which facilitates rapid product transitions between different product families (e.g. EP(D)M and EO plastomers), while still enabling eventual recovery of the valuable unreacted comonomers. This capability further enhances the flexibility of this process to produce a wide variety of dissimilar products.

At the end of the horizontal devolatilizer chamber the concentrated polymer phase flows into a shaft provided with a screw impellor which drives the polymer along the shaft and into an underwater pelletizer, fed with water chilled at 42. The polymer pellets are washed and spun dried at 44 to form pellets suitable for bagging or baling at 46.

Figure 2:
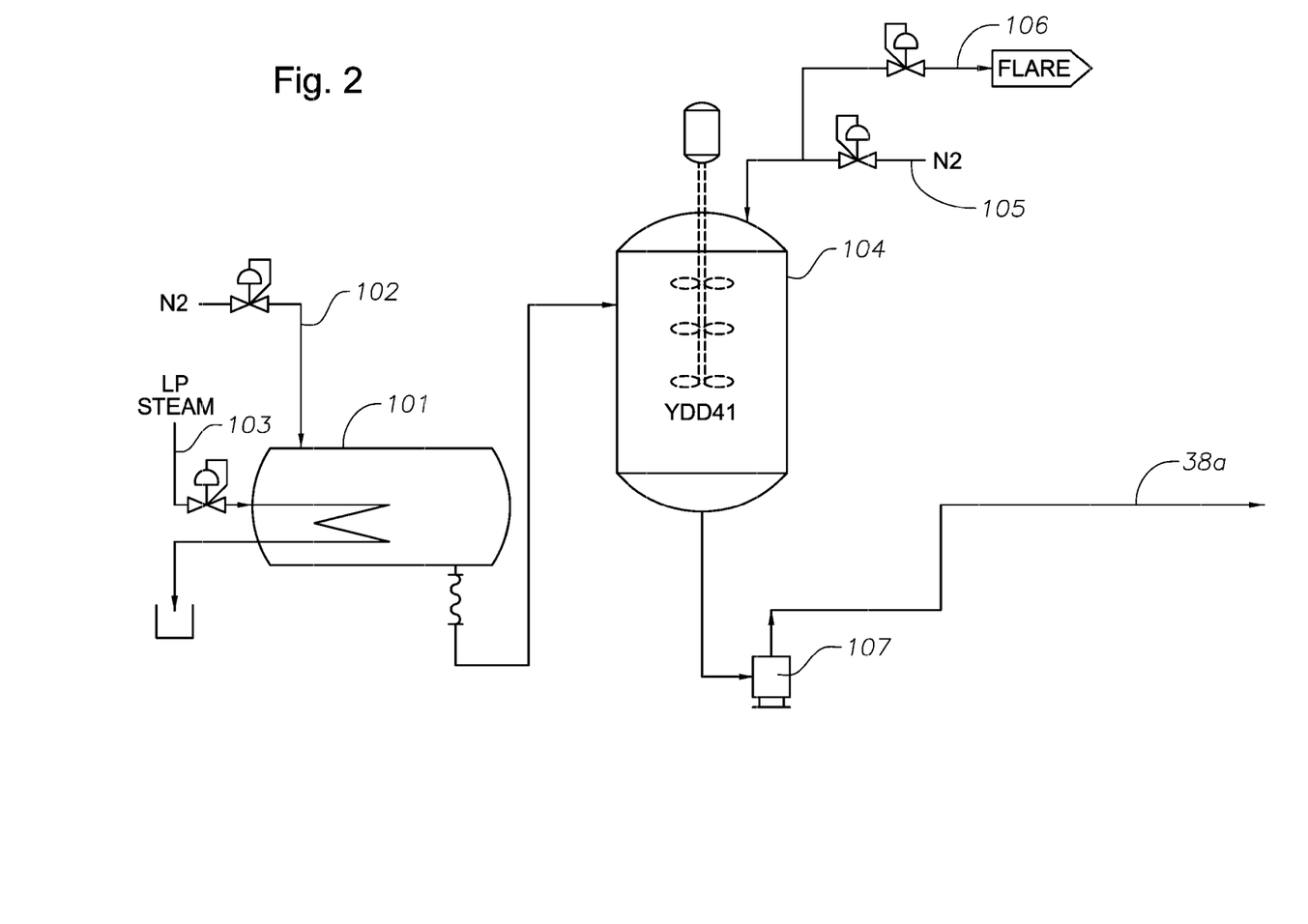
FIG. 2 shows part of the plant of FIG. 1 including an apparatus for the supply of molten stabilizer.

FIG. 2 shows the stabilizer addition means in more detail. Stabilizer arrives in the plant in shipping container 101 which is a 20 ft (6.096 meter) ISO container holding about 24 tons of stabilizer and is equipped with a steam coil. It is then connected to nitrogen supply 102 to keep the stabilizer under a positive pressure of nitrogen and to low pressure steam supply 103 to melt the stabilizer. The molten stabilizer passes from shipping container 101 to the stabilizer charge drum 104, which is also provided with a nitrogen supply line 105 and a vent to a flare. At the bottom of the charge drum, an outlet communicates via a conduit with pump 107 which pumps the stabilizer into the addition location 38a between the gear pump 38 and the devolatilizer 40.

The level of the concentrated polymer phase in the flash tank 34 is monitored by a nuclear radiation sensor (not shown) and the drive of gear pump 38 is controlled to keep the level within set limits. The drive of pump 107 is controlled so that the flow rate of stabilizer is directly proportional to the speed of gear pump 38.

Polymerization of Differing Polymers

The operation of the plant can be described with reference to the Table 1 on the following page. This takes as examples polymerization processes to make a low molecular weight plastomer (as described generally above); a higher molecular weight elastomer (as described above) and a high propylene content ethylene copolymer polymerized as described above.

the desired molecular weight. The heat of polymerization increases the temperature to 150° C. to 200° C. to form a plastomer without the use of hydrogen (although $H_2$ may be used). At the outlet of the second series reactor, the polymer concentration is in the range of from 15 wt % to 22 wt %. The general conditions may be as described in WO 99/45041 incorporated herein by reference.

Water is then supplied at 10 to kill the polymerization reaction which might otherwise continue in the presence of surviving catalyst, unreacted monomer, and elevated temperature.

The heat exchanger 12 raises the temperature initially and then the further heat exchanger 16 causes a further temperature rise to 220° C. A rapid pressure drop results as the polymerization mixture passes through the let-down valve 18 into the liquid phase separator, with the pressure dropping quickly from 100 bar to 40 bar. The pressure differential between that at the outlet of the pump 3 and the outlet of the let down valve 18 is solely responsible for causing the feed and the polymerization mixture to flow through the reactor 8 and the conduit 11 including the heat exchangers 12 and 16.

Inside the liquid phase separator 14 an upper lean phase is formed with less than 0.1 wt % of polymer and a lower polymer rich phase with 30 wt % to 40 wt % of polymer. The concentration is approximately double to triple that of the polymerization mixture fed to the separator 14. After further removal of solvent and monomer in the low-pressure flash tank 34 the concentrated polymer phase is pumped through gear pump 38 and molten stabilizer, octadeyl-3-(3,5-di-tert-butyl-4-hydroxyphenyl)-proportionate (Irganox 1076, m.p. 50-55° C.) is added at point 38a at a rate designed to give a concentration of stabilizer in the polymer of approximately 500 ppm. Immediately downstream of stabilizer addition point 38a, the concentrated polymer phase enters the devolatilizer 40. Polymer leaving the devolatilizer 40 may contain

TABLE 1

Process Conditions of the Plant/Process in Varying Operating Modes

|  | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Plastomer | 50 or down to −15° C.; 120 bar total; 50 bar monomer partial pressure. | 130-200° C.; 100 to 130 bar; 7-22 wt % polymer | 220° C.; 100 to 130 bar; 15-22 wt % polymer | 220° C.; 30 to 45 bar; 15-22 wt % polymer | 220° C.; 30 to 45 bar; <0.3 wt % polymer | 220° C.; 30 to 40 bar; 25-40 wt % polymer |
| Elastomer | 50 or down to −15° C.; 120 bar total; 50 bar monomer partial pressure. | 85° C. to 150° C.; 100 to 130 bar; 8-15 wt % polymer | 220° C.; 100 to 130 bar; 8-15 wt % polymer | 220° C.; 30 to 45 bar; 8-15 wt % polymer | 220° C.; 30 to 45 bar; <0.3 wt % polymer | 220° C.; 30 to 40 bar; 25-40 wt % polymer |
| Predominant Propylene Content Copolymer | 50 or down to −35° C.; 120 bar total; 50 bar monomer partial pressure. | 50 or 80° C.; 100 to 130 bar; 5-15 wt % polymer | 200° C.; 100 bar to 130 bar; 5-15 wt % polymer | 200° C.; 30 to 45 bar; 5-15 wt % polymer | 200° C.; 30 to 45 bar; <0.3 wt % polymer | 220° C.; 30 to 40 bar; 20-40 wt % polymer |

To make plastomer in the plant of FIG. 1, the feed temperature is reduced by the chiller (6) to 0° C. Aluminum alkyl is added as scavenger in amounts appropriate to the poison content of the feed. Alternatively the process of WO 97/22635 (Turner et al.) incorporated herein by reference. The pressure is raised by the centrifugal pump to 120 bar. The feed comprising largely solvent and up to 50 bar partial pressure of ethylene and butene or hexene or octene comonomer then enters the first of the two series reactors 8. Catalyst and activator is added to the reactors 8 in amounts to create the desired polymerization temperature which in turn is related to less than 1 wt %, preferably with 0.3 wt % or less, even more preferably <0.1 wt % of volatiles, including water.

With two reactors in series, the disclosure of WO 99/45047 (Harrington et al.), incorporated herein by reference, may be used. Generally speaking, in a series lay out it is preferable that the first reactor operates at temperatures between 0° C. to 110° C. and the second reactor operates between 40° C. to 140° C. Preferably the first reactor operates at temperatures between 10° C. to 90° C. and the second reactor operates between 50° C. to 120° C. More preferably, the first reactor operates at temperatures between 20° C. to 70° C. and the second reactor operates between 60° C. to 110° C. With appropriate control of process conditions and poison levels temperature of this order of magnitude may also be obtained where one reactor only is used or two reactors are used under the same process conditions.

The same may be said about the row in Table 1 marked "Predominant propylene content copolymer" where the temperature is lowered to allow the less reactive propylene monomer to form a sufficiently high molecular weight. The general conditions described in WO 00/01745, incorporated herein by reference, may be used. In the runs, the polymerization temperature varied between 28° C. and 70° C.

While the process windows have been illustrated using prior art disclosures which suggest metallocene selection and the suitable operating window for a given polymer type, to the extent that prior published patent specifications are used to assist in such illustration, it should be kept in mind that these patent specifications did not provide the separation and recycle and purification conditions in a continuous plant with a recycle permitting full exploitation of the product capabilities of high activity metallocene catalyst systems at which the processes are best operated. This disclosure provides a plant and process which uses the given metallocene catalyst systems disclosed to make the target polymers at high metallocene activity, under a wide range of polymerization conditions and with considerable energy and investment savings.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A plant for the continuous solution polymerization of a feed comprising one or more olefin monomers and a solvent, the plant comprising:
    a reactor;
    a conduit for supplying a feed of one or more olefin monomers in a solvent to the reactor and a conduit for supplying a catalyst to the reactor to form a polymer-containing polymerization reaction mixture;
    downstream of the reactor a liquid phase separator for separating the reaction mixture into a polymer-rich phase and a polymer-lean phase;
    downstream of the liquid phase separator a low pressure separator for separating the polymer rich phase into a vapour phase and a concentrated polymer phase; and
    downstream of the low pressure separator for separating the polymer rich phase, a vacuum devolatilizer for removing volatile components from the concentrated polymer phase,
    wherein the plant also includes an apparatus for adding stabilizer to the concentrated polymer phase at a location downstream of the low pressure separator for separating the polymer rich phase.

2. The plant of claim 1, in which the stabilizer is a molten stabilizer.

3. The plant of claim 1, in which the stabilizer is in solution in a solvent.

4. The plant of claim 1, wherein the low pressure separator for separating the polymer rich phase is a flash tank and the plant further comprises a gear pump located downstream of the flash tank and upstream of the devolatilizer and the apparatus for adding stabilizer is arranged to introduce the stabilizer into the concentrated polymer phase at a rate which is controlled in relation to the speed of the gear pump.

5. The plant of claim 4, in which the stabilizer is introduced into the concentrated polymer phase downstream of the gear pump.

6. A plant for the continuous solution polymerization of a feed comprising one or more olefin monomers and a solvent, the plant comprising:
    a reactor;
    a conduit for supplying a feed of one or more olefin monomers in a solvent to the reactor and a conduit for supplying a catalyst to the reactor to form a polymer-containing polymerization reaction mixture;
    downstream of the reactor a liquid phase separator for separating the reaction mixture into a polymer-rich phase and a polymer-lean phase;
    downstream of the liquid phase separator a flash tank for separating the polymer rich phase into a vapour phase and a concentrated polymer phase; and
    downstream of the flash tank a vacuum devolatilizer for removing volatile components from the concentrated polymer phase,
    wherein the plant also includes an apparatus for adding a molten stabilizer to the polymer at a location downstream of the reactor.

7. A plant as claimed in claim 6 in which the apparatus for adding stabilizer is arranged to introduce a molten stabilizer into the concentrated polymer phase downstream of the flash tank.

8. The plant of claim 6, in which the apparatus for adding stabilizer is arranged to introduce a molten stabilizer into the concentrated polymer phase upstream of the vacuum devolatilizer.

9. The plant of claim 6, which also comprises a gear pump located downstream of the flash tank and upstream of the devolatilizer and the apparatus for adding stabilizer is arranged to introduce the molten stabilizer into the concentrated polymer phase at a rate which is controlled in relation to the speed of the gear pump.

10. The plant of claim 9, in which the molten stabilizer is introduced into the concentrated polymer phase downstream of the gear pump.

11. The plant of claim 6, in which the apparatus for adding stabilizer comprises a stabilizer storage vessel, heating means to heat the stabilizer storage vessel, and a metering pump to pump molten stabilizer from the stabilizer storage vessel and into a conduit located downstream of the reactor.

12. The plant of claim 11, which comprises a heating system to heat a shipping container to melt stabilizer contained therein and a conduit to connect the shipping container to the stabilizer storage vessel for transfer of the molten stabilizer from the shipping container to the stabilizer storage vessel.

* * * * *